(12) United States Patent
Parri et al.

(10) Patent No.: US 8,414,983 B2
(45) Date of Patent: Apr. 9, 2013

(54) PARTICLE BEAM PROCESS FOR THE ALIGNMENT OF REACTIVE MESOGENS

(75) Inventors: Owain Llyr Parri, Hampshire (GB); Alison Linda May, Dorset (GB); Julian Vaughan-Spickers, Southampton (GB); Karl Skjonnemand, Southampton (GB); Oleg Yaroshchuck, Kyiv (UA)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 0 days.

(21) Appl. No.: 12/439,403

(22) PCT Filed: Aug. 10, 2007

(86) PCT No.: PCT/EP2007/007078
§ 371 (c)(1),
(2), (4) Date: Feb. 27, 2009

(87) PCT Pub. No.: WO2008/028553
PCT Pub. Date: Mar. 13, 2008

(65) Prior Publication Data
US 2010/0020284 A1    Jan. 28, 2010

(30) Foreign Application Priority Data
Sep. 2, 2006 (EP) .................................. 06018417

(51) Int. Cl.
*B05D 3/06* (2006.01)
*H05H 1/00* (2006.01)

(52) U.S. Cl. ....................................... 427/535; 427/536

(58) Field of Classification Search .................. 427/535, 427/536, 539, 569
See application file for complete search history.

(56) References Cited

U.S. PATENT DOCUMENTS

| | | | |
|---|---|---|---|
| 2005/0014882 A1 | 1/2005 | Brungardt et al. | |
| 2005/0140882 A1 | 6/2005 | Park et al. | |
| 2005/0281959 A1* | 12/2005 | Song | 427/569 |
| 2006/0172091 A1* | 8/2006 | Tung et al. | 427/535 X |

FOREIGN PATENT DOCUMENTS

| | | |
|---|---|---|
| JP | 08 101390 | 4/1996 |
| WO | 2004104682 A | 12/2004 |
| WO | 2005015298 A | 2/2005 |
| WO | 2005096084 A | 10/2005 |
| WO | 2008028553 R | 3/2008 |

OTHER PUBLICATIONS

Dainippon Printing Co Ltd., "Liquid crystal display device and its production," Patent Abstracts of Japan, Publication Date: Apr. 16, 1996; English Abstract of JP-08-101390.

* cited by examiner

*Primary Examiner* — Leo B Tentoni
(74) *Attorney, Agent, or Firm* — Millen, White, Zelano & Branigan, P.C.

(57) ABSTRACT

The invention relates to a method of aligning reactive mesogens (RM) on a substrate subjected to particle beam treatment, to RM's oriented by said method, especially in form of thin layers, to oriented polymers and polymer films obtained from such oriented RM's and RM layers, and to the use of the RM's, layers, polymers and films in optical, electronic and electrooptical applications.

26 Claims, 5 Drawing Sheets

PARTICLE BEAM PROCESS FOR THE ALIGNMENT OF REACTIVE MESOGENS

FIELD OF THE INVENTION

The invention relates to a method of aligning reactive mesogens (RM) on a substrate subjected to particle beam treatment, to RM's oriented by said method, especially in form of thin layers, to oriented polymers and polymer films obtained from such oriented RM's and RM layers, and to the use of the RM's, layers, polymers and films in optical, electronic and electrooptical applications.

The invention relates to an improved electronic device, like an organic field emission transistor (OFET), which has a short source to drain channel length and contains an organic semiconducting formulation comprising a semiconducting binder.

BACKGROUND AND PRIOR ART

In many optical and electrooptical devices, like liquid crystal displays (LCD) it is often required to control the alignment of the LC medium. Reviews of conventional alignment techniques are given for example by I. Sage in "Thermotropic Liquid Crystals—Applications and Uses Vol. 3" edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Typically, high surface energy substrates or alignment layers are used to obtain uniform alignment of the LC's which do usually form the active (i.e. switchable) component of the display. For example, rubbed polyimide, TAC or PET films are often used to obtain planar alignment of LC's. Other, less common polar materials, e.g. cellulose nitrate have also been reported as alignment layers, for example in U.S. Pat. No. 5,805,253. For achieving homeotropic (perpendicular) alignment of LC materials, the simplest way is to use a substrate with a low surface energy (e.g. PTFE). In this case the energy of the system is minimised by having the LC molecules in contact with each other rather than with the surface, resulting in homeotropic alignment. Unfortunately, this approach is limited and there are few examples of low surface energy, plastic substrates of the optical quality required for use in LCDs. Alternatively, a homeotropic alignment layer can be used, for example a thin layer of a surfactant that 'seeds' homeotropic alignment (e.g. lecithin). Other examples exist where a plastic substrate is coated with a low surface energy alignment layer, as disclosed for example in U.S. Pat. Nos. 5,456,867, 6,379,758 and 6,816,218. However, the use of an alignment layer does generally add extra cost to the production of the device.

The above-mentioned alignment techniques and materials can be used to align both conventional LC materials and polymerizable LC materials, also known as reactive mesogens (RM).

Polymerized layers of oriented RM's are typically used to form a passive (non-switchable) component of an LCD. For example they can be used to compensate LCD displays of various modes, like the VA (vertically aligned), TN (twisted nematic), STN (supertwisted nematic), IPS (in plane switching) or OCB (optically compensated bend) mode. The layers can be in the form of separate compensation films laminated to the outside of the LC display, or can be formed as part of the LC display cell, also known as "in-cell" application. A typical colour LCD with an in-cell RM layer is shown in FIG. 1, comprising two glass substrates (1), an active layer (2) comprising a switchable LC medium, a colour filter (3), two electrode layers (4) for example of indium tin oxide (ITO), two alignment layers (5) of e.g. rubbed polyimide, and an RM layer (6). The advantage of such an in-cell RM layer is inter alia that its application can be carried out by the LCD manufacturer, giving the manufacturer control over the cost and the desired optics. Further advantages of in-cell RM layers are improved optical properties, like reduced parallax problems. In many cases the ideal positioning for this layer is between the colour filter and the ITO layer of the display.

Alignment of the RM layer before polymerization is critical for correct optical performance. The alignment of RM's is usually achieved by rubbing a polymer substrate or film. The alignment quality varies depending on the rubbing process and the properties of the substrate or film. Thus the rubbing process is difficult to optimise. Furthermore the rubbing process charges substrates and produces particles that are difficult to control in high-class clean rooms. To this end, uniformity of LC alignment provided by rubbing is far from ideal, especially in case of microdisplays.

Another method to align RM's suggested in prior art is photoalignment [see M. Schadt et al., J. Appl. Phys., 34, 3240 (1995)]. However this method adds an extra coating and then processing step. In addition, photoalignment gives rather variable results.

Another method to achieve uniform alignment of LC's that has been reported in prior art is the isotropic processing of liquid crystal (LC) alignment substrates with plasma of glow discharge, which is used to realise surface etching, grafting of the aligning surfaces with various atoms as well as plasma polymerization [see J. C. Dubois, M. Gazard, and A. Zann, Appl. Phys. Letters, 24(7), 297 (1974); R. Watanabe, T. Nakano, T. Satoh, H. Hatoh, and Y. Ohki, Jpn. J. Appl. Phys., 26(3), 373 (1987); S. P. Kurchatkin, N. A. Muravyeva, A. L. Mamaev, V. P. Sevostyanov, and E. I. Smirnova, Patent of Russia No 2,055,384; A. I. Vangonen, and E. A. Konshina. Mol. Cryst. Liq. Cryst., 304, 507 (1997)]. These processes allow the zenital anchoring energy and pretilt angle of LC to be varied. At the same time, planar and tilted LC alignment cannot be achieved by this treatment, because it does not induce surface anisotropy of the alignment films. To generate LC alignment in-plane of the aligning substrates (uniform planar or tilted alignment) the substrates are preliminarily rubbed using conventional procedure.

Another particle beam treatment method to achieve planar/tilted LC alignment involves directed plasma fluxes obliquely impinging on the alignment substrates. For example, in the method described in G. J. Sprokel and R. M. Gibson, J. Electrochem. Soc., 124(4), 559 (1977), the bounding substrates are exposed to a "cold" r.f. plasma carried to the substrates with the directed gas stream; reaction of plasma and the substrate led to the structures capable of alignment. WO 2004/104682 A1 discloses a plasma beam procedure developed for the alignment of active LC's in LCD's. Therein, an alignment film or layer for aligning LC's is bombarded with a plasma beam from a plasma beam source. The method described in WO 2004/104682 A1 employs beams of accelerated plasma generated by anode layer source (ALS) from the Hall family [see V. Zhurin, H. Kaufman, and R. Robinson, Plasma Sources Sci. Technol., 8, 1 (1999)]. The use of anode layer source instead of traditional Kaufman source allows to obtain the following advantages: (1) particle beams naturally compensated with electrons, (2) extended range of LC alignment parameters and alignment modes, (3) simplified construction of particle beam sources, (4) enhanced reliability of sources, (5) ease of scaling of the sources and treatment of large-area substrates.

However, the prior art references as described above refer to the use of non-rubbing techniques like plasma treatment only for aligning active LC's in LCD's, and do still require the use of an alignment layer. On the other hand, it is most desirable to be able to align LC's and especially RM's on any substrate.

One aim of the present invention is to provide a method for aligning LC's and especially RM's, without the need of rubbing or alignment layers, which provides uniform and stable alignment of the materials applied thereon, is easy to use in particularly in mass production, and does not have the drawbacks of prior art methods described above. Other aims of the present invention are immediately evident to the person skilled in the art from the following detailed description.

The inventors have found that these aims can be achieved by providing a method as described hereinafter. In particular, it was surprisingly found that the plasma beam procedure by anode layer source irradiation as disclosed in WO 2004/104682 A1 can be effectively used to align RM's practically on any substrate, in particular on colour filter layers and bare plastic films as used in conventional LCDs. The use of extra aligning materials or layers, as described in WO 2004/104682 A1, is not necessary. It was also found that the roll-to-roll plasma beam processing of flexible substrates can be realized by the use of this method.

SUMMARY OF THE INVENTION

The invention further to a process for aligning reactive mesogens (RM), comprising the steps of
    exposing at least a portion of a substrate to a particle beam that produces an aligning direction on said substrate, and
    applying a layer comprising one or more RM's onto said substrate.

The invention further relates to a process as described above and below, which further comprises the step of polymerizing or crosslinking the oriented RM layer, and optionally removing the polymerized or crosslinked RM layer from the substrate.

The invention further relates to oriented RM layers, polymers and polymer films obtainable by a process as described above and below.

The invention further relates to the use of RM layers and polymer films as described above and below in optical, electronic and electrooptical devices or components thereof.

The invention further relates to an optical, electronic or electrooptical device, or a component thereof, comprising an RM layer or polymer film as described above and below.

Said devices and components include, without limitation electrooptical displays, LCDs, optical films, polarisers, compensators, beam splitters, reflective films, alignment layers, colour filters, holographic elements, hot stamping foils, coloured images, decorative or security markings, LC pigments, adhesive layers, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schoftky diodes, planarising layers, antistatic films, conducting substrates, conducting patterns.

Terms And Definitions

The term "particle beam" means a beam of ions, neutrals, electrons, plasma or the mixtures thereof.

The term "plasma beam" or "accelerated plasma beam" means a particle beam beginning in a glow discharge and pushed out of the discharge area by an electric field.

The term "anode layer source" means a particle beam source from the family of closed electron drift sources generating fluxes of accelerated plasma.

The term "film" includes rigid or flexible, self-supporting or free-standing films with mechanical stability, as well as coatings or layers on a supporting substrate or between two substrates.

The term "reactive mesogen" (RM) means a polymerisable mesogenic or liquid crystal compound.

The term "liquid crystal or mesogenic material" or "liquid crystal or mesogenic compound" means materials or compounds comprising one or more rod- or board-shaped (calamitic) or disk-shaped (discotic) mesogenic groups, i.e. groups with the ability to induce liquid crystal (LC) phase behaviour. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal material" is used hereinafter for both mesogenic and LC materials.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

The term "director" is known in prior art and means the preferred orientation direction of the long molecular axes (in case of calamitic compounds) or short molecular axis (in case of discotic compounds) of the mesogenic groups in an LC or RM material. In films comprising uniaxially positive birefringent LC or RM material the optical axis is given by the director.

The term "homeotropic orientation" refers to a layer or film wherein the optical axis is substantially perpendicular to the film plane.

The term "planar orientation" refers to a layer or film wherein the optical axis is substantially parallel to the film plane.

The term "tilted orientation" refers to a layer or film wherein the optical axis is tilted at an angle θ between 0 and 90° relative to the film plane.

The term "splayed orientation" means a tilted orientation as defined above,
wherein the tilt angle varies in the direction perpendicular to the film plane, preferably from a minimum to a maximum value.

The average tilt angle $\theta_{ave}$ is defined as follows $$\theta_{ave} = \frac{\sum_{d'=0}^{d} \theta'(d')}{d}$$

wherein θ'(d') is the local tilt angle at the thickness d' within the film, and d is the total thickness of the film.

The tilt angle of a splayed film hereinafter is given as the average tilt angle $\theta_{ave}$, unless stated otherwise.

The term "A plate" means an optical retarder utilizing a layer of uniaxially birefringent material with its extraordinary axis oriented parallel to the plane of the layer.

The term "C plate" means an optical retarder utilizing a layer of uniaxially birefringent material with its extraordinary axis perpendicular to the plane of the layer.

The term "O plate" means an optical retarder utilizing a layer of uniaxially birefringent material with its extraordinary axis tilted at an angle to the plane of the layer.

In A- and C-plates comprising optically uniaxial birefringent liquid crystal material with uniform orientation, the optical axis of the film is given by the direction of the extraordinary axis.

An A plate or C plate comprising optically uniaxial birefringent material with positive birefringence is also referred to as "+A/C plate" or "positive A/C plate". An A plate or C plate comprising a film of optically uniaxial birefringent material with negative birefringence is also referred to as "−A/C plate" or "negative A/C plate".

The term "azimuthal angle" ($\phi$) means an angle in the plane of the layer or film between the director and a reference axis.

The term "zenithal angle" ($\theta$) means the tilt angle as defined above.

DETAILED DESCRIPTION OF THE INVENTION

To align RM's the method according to the present invention utilizes particle beam etching procedure, particularly, the plasma beam procedure. This method has been suggested in WO 2004/104682 A1, the entire disclosure of which is incorporated into this application by reference, for the alignment of active LC's in LCD's on a substrate carrying an additional alignment layer.

Figure 1:
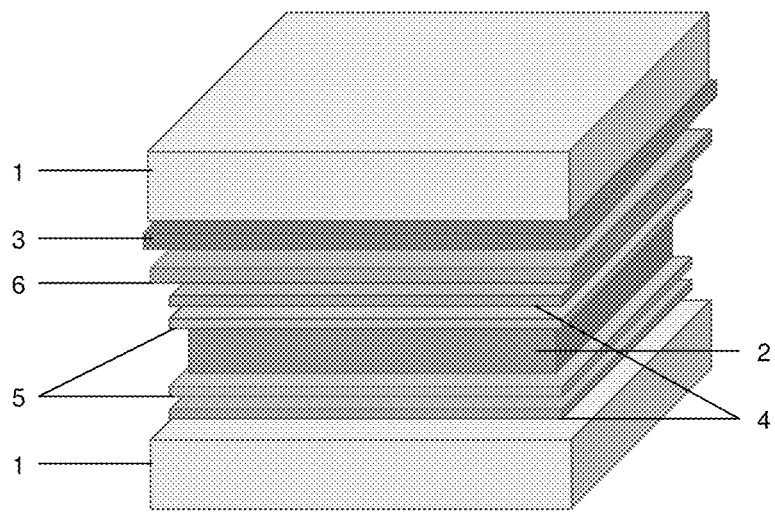
FIG. 1 depicts a typical colour LCD with an in-cell RM layer.
Figure 2A:
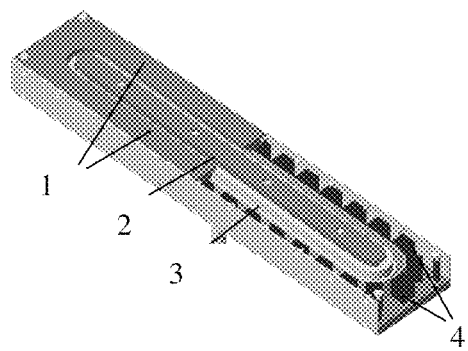
FIG. 2 schematically depicts an anode layer source (ALS) as used in a process according to the present invention.
Figure 2B:
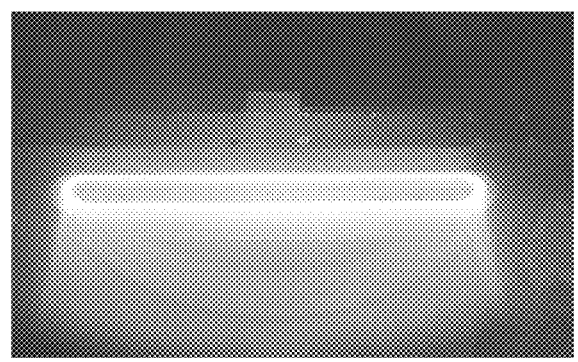

The plasma beam is preferably provided by an anode layer source (ALS) from the Hall family of electrostatic sources. This is designed to provide a collimated flux of particles from practically any gaseous feed. The particle flux is formed in the crossed electric and magnetic fields directly within the discharge channel. Because of the high anode potential, the part of plasma is pushed out of the discharge area so that a beam of accelerated plasma is generated. In contrast to the Kaufman source widely used for the ion beam alignment processing, ALS does not contain grids and hot elements (such as filaments and other secondary electron sources); the structure is thus simple and allows one to substantially increase reliability. The ALS construction is exemplarily depicted in FIG. 2a, including outer cathodes (1), inner cathodes (2), anode (3) and permanent magnets (4). The glow discharge and plasma flux is shown in FIG. 2b. The important feature of the ALS is a racetrack shape of glow discharge so that the source generates two "sheets" of accelerated plasma. This allows one to treat relatively large substrates by translation or roll-to-roll translation for flexible plastic films. In the present invention, preferably two exposure geometries giving similar alignment results are used. The irradiation schemes preferably used are exemplarily illustrated in FIG. 3, where (1) indicates the ALS, (2) the moving direction, (3) the plasma sheet, (4) the substrate and (5) the substrate holder. Therein, scheme a) shows geometry 1 with the source moving and scheme b) shows geometry 2 with the substrate holder moving. The exposure angle, accounted from the substrate's normal, is preferably in the range from 45° to 85°. The distance between source and substrate depends on the exposure angle. For example, in exposure geometry b) of FIG. 3, it is typically varied from 6 to 25 cm. With lengthening this distance the pressure or anode potential should preferably be increased to keep constant the current density of plasma flux.

The residual pressure in a chamber should preferably be lower than $3*10^{-5}$ Torr. The feed gas typically used is argon. The working pressure, p, is preferably in the range from $1\text{-}6*10^{-4}$ Torr. The anode potential, U, varies typically from 400 V to 3000 V. Typically current density, j, is preferably in the range $0.5\text{-}50\,\mu A/cm^2$ determined by the values of p and U.

Treatment of a colour filter layers, bare glass substrates and plastic films by a plasma beam method according to the present invention could be used to produce planar or tilted alignment of nematic, cholesteric or smectic RM mixtures. An alignment layer or rubbing method is not needed.

In addition, the alignment treatment of rollable plastic substrates can be realized by roll-to-roll translation. In this case the plasma beam processing is provided during roll-to-roll rewinding of a plastic strip For example, this could be achieved by placing the roll in a vacuum chamber so that the appropriate vacuum is realised, and subsequently exposing the film to plasma treatment whilst moving the substrate from the unwind roller to the wind-up roller. This roll can then be subsequently coated with the appropriate RM solution using conventional coating techniques.

In addition, patterned alignment (i.e. a pattern of regions with different alignment) can be realized by the use of masks and multiple irradiation steps. Without realignment of source and substrate the ALS irradiation system allows one mask and two-step irradiation process to obtain patterns with mutually perpendicular optical axis in the film plane.

By using the method according to the present invention, various alignment directions can be induced in the RM's, for example planar, homeotropic or splayed alignment depending on the exposure dose and incidence angle of the plasma flux, and the type of RMs used Thus, it is possible to prepare polymerized RM films having the optical properties of an A plate, a C plate or an O plate.

A further use of this technique is the alignment of one RM film on top of a second RM film. This allows the production of more complex compensator structures. At present, multilayer compensator structures are formed by lamination of separately coated layers and (probably) delamination of carrier substrates. In contrast, coating of one RM layer directly on another one gives the advantages of removing lamination steps and also giving a much thinner product.

As substrate for example glass or quartz sheets or plastic films can be used. It is also possible to put a second substrate on top of the coated RMs prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used. Suitable and preferred plastic substrates are for example films of polyester such as polyethyleneterephthalate (PET) or polyethylene-naphthalate (PEN), polyether sulfone (PES), polyvinylalcohol (PVA), polycarbonate (PC) or triacetylcellulose (TAC), very preferably PET or TAC films. The substrate can also be a component of an optical, electrooptical or electronic device LC display, for example a colour filter layer in an LCD or a layer of a material commonly used for fabricating chips, like for example silicon. Substrates comprising one or more layers or films of the above-mentioned materials can also be used. It is also possible to use a substrate, e.g. of the materials as described above, which is coated with an additional layer, like e.g. $SiO_2$, which can serve e.g. as gas barrier layer and/or alignment layer.

The RM material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the RM material in a suitable solvent. This solution is then coated or printed onto the substrate, for example by spin-coating or printing or other known techniques, and the solvent is evaporated off before polymerisation. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents Preferred embodiments of the invention are the following:
the substrate does not comprise an alignment layer,
the substrate is not rubbed,
the substrate comprises an organic or inorganic material,
the substrate is selected from glass, quartz, plastic or silicon,
the substrate is a colour filter,
at least a portion of the substrate is bombarded with a plasma beam from a plasma beam source at an incident angle of from >0° to 85° relative to the substrate normal,
the incident angle is from 20° to 85°, preferably from 45° to 85°,
the substrate is positioned at a distance of from 5 to 50 cm, preferably from 6 to 15 cm from the plasma beam source,
the exposed portion of the substrate imparts to the RMs an alignment direction having an azimuth angle φ of about 0° and a zenithal angle θ of 0° to 40°, or an azimuth angle φ of about 90° and a zenithal angle θ of about 0°,
the alignment induced in the RM layer by said is planar alignment,
the alignment induced in the RM layer by said is homeotropic alignment,
the alignment induced in the RM layer by said is tilted alignment,
the plasma beam source is a closed drifter thruster,
the plasma beam source is an anode layer thruster,
the current density of the plasma beam is preferably from 0.1 to 1000 μA/cm², very preferably from 0.5 to 30 μA/cm²,
the ion energy is from 100 to 5000 eV, preferably from 400 eV to 3000 eV,
the process further comprises the step of utilizing a mask to prevent the plasma beam from reaching a predetermined portion of the substrate, for example by applying a mask to the substrate before or during plasma beam exposure,
that the alignment induced in the RM layer by said process comprises a pattern of at least two regions having different alignment direction,
the plasma beam is in the form of a sheet,
the process further comprises the step of moving the aligning substrate through a path of the plasma beam,
the process is roll-to-roll alignment treatment of rollable plastic substrates.

The method according to the present invention is also compatible with other vacuum processes employed in LCD industry, including but not limited to, ITO deposition, TFT coating, vacuum filling of LCD, etc. This can be advantageously used in an entirely vacuum technological line of LCD production, which can strongly reduce the well-known problems related to dust, humidity, air ions etc.

The alignment preliminarily induced by plasma beam can also be modified, or even overwritten, by subsequent plasma irradiation steps. This feature, for instance, can be used e.g. to generate a pretilt angle on a substrate that was preliminarily treated to align the RM's in planar orientation. Also, the possibility to overwrite alignment reduces a number of masking processes used for cell patterning. Particularly, for two-domain alignment only one mask is required.

The plasma treatment of the present invention can also be used to override alignment induced with other methods (e.g., rubbing, photoalignment, etc.). This means that plasma method may be successively combined with other methods for sample patterning The RM's are preferably selected from calamitic or discotic monomers, very preferably calamitic monomers. These materials typically have good optical properties, like reduced chromaticity, and can be easily and quickly aligned into the desired orientation, which is especially important for the industrial production of polymer films at large scale. The RM's may contain dichroic dyes. It is also possible that the polymerisable material comprises one or more discotic monomers. Very preferably mixtures comprising one or more RM's and optionally one or more further components or additives are used.

Especially preferred are RM's or RM mixtures having a nematic, smectic or cholesteric phase.

Preferably the RM's are selected from formula I

P-Sp-MG-R     I wherein
P is a polymerisable group,

Sp is a spacer group or a single bond,

R is selected from H, F, Cl, Br, I, CN, NCS, SF$_5$, or straight-chain or branched alkyl having 1 to 30 C-atoms that is optionally mono- or polysubstituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or denotes P-Sp-, R$^0$ and R$^{00}$ independently of each other denote H or alkyl with 1 to 12 C-atoms, and MG is a rod-like mesogenic group that is optionally chiral.

MG is preferably selected of formula II

-(A$^1$-Z$^1$)$_m$-A$^2$-     II wherein

A and A2 are, in case of multiple occurrence independently of one another, an aromatic or alicyclic group, which optionally contains one or more heteroatoms selected from N, O and S, and is optionally mono- or polysubstituted by R as defined in formula I, Z$^1$ in case of multiple occurrence independently of one another denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$—, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, R$^0$ and R$^{00}$ are as defined in formula I, Y$^1$ and Y$^2$ independently of each other denote H, F, Cl or CN, m is 0, 1, 2, 3 or 4.

Preferred groups A$^1$ and A$^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, naphthalene, tetrahydronaphthalene, anthracene and phenanthrene, all of which are optionally substituted by one or more groups L.

Preferably L is selected from F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, preferably 1 to 6 C atoms, and straight chain or branched alkyl, alkoxy, alkylcarbonyl, alkoxycarbonyl, alkylcarbonlyoxy or alkoxycarbonyloxy with 1 to 12, preferably 1 to 6 C atoms, wherein one or more H atoms are optionally replaced by F or Cl, wherein R$^0$ and R$^{00}$ are as defined in formula I and X is halogen.

Particular preferred groups A$^1$ and A$^2$ are selected from 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted, mono- or polysubstituted by L as defined above.

More preferably L is selected from F, Cl, CN, NO$_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated.

Most preferably L is selected from F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, in particular F, Cl, CN, CH$_3$, C$_2$H$_5$, C(CH$_3$)$_3$, CH(CH$_3$)$_2$, OCH$_3$, COCH$_3$ or OCF$_3$, most preferably F, Cl, CH$_3$, C(CH$_3$)$_3$, OCH$_3$ or COCH$_3$.

If A$^1$ or A$^2$ is substituted phenyl, it is preferably selected from

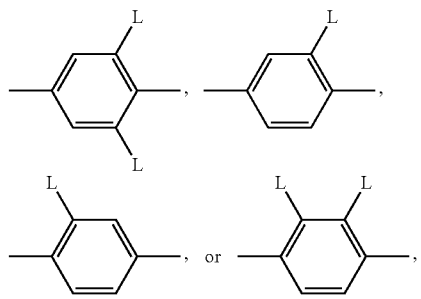

with L having each independently one of the meanings given above.

If R is an alkyl or alkoxy radical, i.e. where the terminal CH$_2$ group is replaced by —O—, it can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3 oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more CH$_2$ groups are replaced by —CH=CH—can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are C$_2$-C$_7$-1E-alkenyl, C$_4$-C$_7$-3E-alkenyl, C$_5$-C$_7$-4-alkenyl, C$_6$-C$_7$-5-alkenyl and C$_7$-6-alkenyl, in particular C$_2$-C$_7$-1E-alkenyl, C$_4$-C$_7$-3E-alkenyl and C$_5$-C$_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one CH$_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in co-position. Examples for especially preferred straight-chain groups with a terminal F substituent are fluoromethyl, 2-fluorethyl, 3-fluorpropyl, 4-fluorbutyl, 5-fluorpentyl, 6-fluorhexyl and 7-fluorheptyl. Other positions of F are, however, not excluded.

Halogen is preferably F or Cl.

R can be an achiral or a chiral group. In a preferred embodiment it is a chiral group, very preferably selected of formula III:

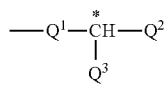
III wherein
$Q^1$ is alkylene or alkylene-oxy with 1 to 9 C atoms, arylene or heteroarylene as defined above, or a single bond,
$Q^2$ is alkyl or alkoxy with 1 to 10 C atoms which may be unsubstituted, mono- or polysubstituted by F, Cl, Br or CN, it being also possible for one or more non-adjacent $CH_2$ groups to be replaced, in each case independently from one another, by
—C≡C—, —O—, —S—, —NH—, —N($CH_3$)—, —CO—, —COO—, —OCO—, —OCO—O—, —S—CO— or —CO—S— in such a manner that oxygen atoms are not linked directly to one another, or aryl or heteroaryl as defined above, being different from $Q^1$ or $Q^3$,
$Q^3$ is F, Cl, Br, CN or alkyl, alkoxy, aryl or heteroaryl as defined for $Q^2$ but being different from $Q^2$ or $Q^1$,
In case $Q^1$ in formula II is an alkylene-oxy group, the O atom is preferably adjacent to the chiral C atom.

Preferred chiral groups of formula II are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The polymerisable group P is a group that is capable of participating in a polymerisation reaction, like radical or ionic chain polymerisation, polyaddition or polycondensation, or capable of being grafted, for example by condensation or addition, to a polymer backbone in a polymer analogous reaction. Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Very preferably the polymerisable group P is selected from $CH_2$=$CW^1$—COO—, $CH_2$=$CW^1$—CO—,

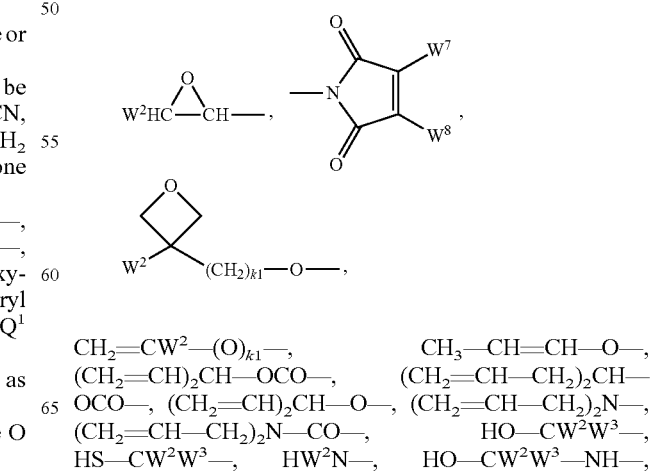

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—,

CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^5$Si—, with W$^1$ being H, F, Cl, CN, CF$_3$, phenyl or alkyl with 1 to 5 C-atoms, in particular H, C$_1$ or CH$_3$, W$^2$ and W$^3$ being independently of each other H or alkyl with 1 to 5 C-atoms, in particular H, methyl, ethyl or n-propyl, W$^4$, W$^5$ and W$^6$ being independently of each other Cl, oxaalkyl or oxacarbonylalkyl with 1 to 5 C-atoms, W$^7$ and W$^8$ being independently of each other H, Cl or alkyl with 1 to 5 C-atoms, Phe being 1,4-phenylene that is optionally substituted by one or more groups L as defined above, and k$_1$ and k$_2$ being independently of each other 0 or 1.

Especially preferred groups P are CH$_2$=CH—COO—, CH$_2$=C(CH$_3$)—COO—, CH$_2$=CH—, CH$_2$=CH—O—, (CH$_2$=CH)$_2$CH—OCO—, (CH$_2$=CH)$_2$CH—O—,

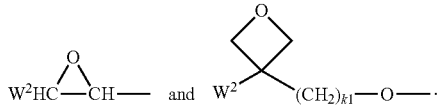

Especially preferably P is a vinyl group, an acrylate group, a methacrylate group, an oxetane group or an epoxy group, especially preferably an acrylate or methacrylate group.

Very preferred are acrylate and oxetane groups. Oxetanes produce less shrinkage upon polymerisation (cross-linking), which results in less stress development within films, leading to higher retention of ordering and fewer defects. Oxetane cross-linking also requires a cationic initiator, which unlike a free radical initiator is inert to oxygen.

As spacer group all groups can be used that are known for this purpose to the skilled in the art. The spacer group Sp is preferably of formula Sp'-X', such that P-Sp is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, R$^0$ and R$^{00}$ are independently of each other H or alkyl with 1 to 12 C-atoms, and Y$^1$ and Y$^2$ are independently of each other H, F, Cl or CN.

X' is preferably —O—, —S—CO—, —COO—, —OCO—, —O—COO—, —CO—NR$^0$—, —NR$^0$—CO—, —NR$^0$—CO—NR$^0$— or a single bond.

Typical groups Sp' are, for example, —(CH$_2$)$_p$—, —(CH$_2$CH$_2$O)$_q$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_p$—, with p being an integer from 2 to 12, q being an integer from 1 to 3 and R$^0$ and R$^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example.

Sp and Sp' can be an achiral or a chiral group. In a preferred embodiment Sp or Sp' is a chiral group. Chiral groups Sp' are very preferably selected of formula III:

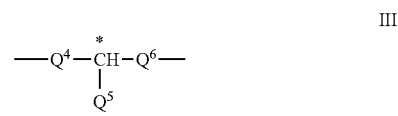

wherein

Q$^4$ is an alkylene or alkylene-oxy group with 1 to 9 C atoms or a single bond, Q$^5$ is an alkyl or alkoxy group with 1 to 10 C atoms which may be unsubstituted, mono- or polysubstituted by F, Cl, Br or CN, it being also possible for one or more non-adjacent CH$_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, Q$^6$ is an alkylene or alkylene-oxy group with 1 to 10 C atoms or a single bond, being different from Q$^4$, with Q$^4$ being linked to the polymerisable group P.

Further preferred are compounds with one or two groups P-Sp- wherein Sp is a single bond. In case of compounds with two groups P-Sp-, each of the two polymerisable groups P and the two spacer groups Sp can be identical or different.

In another preferred embodiment of the present invention the RM's are selected from chiral compounds of formula IV

(R-(A$^1$-Z$^1$)$_m$)$_k$-Q          IV wherein R, A$^1$, Z$^1$ and m are as defined above, and at least one R is P-Sp-, with P and Sp being as defined above, Q is a k-valent chiral group, k is 1, 2, 3, 4, 5 or 6.

Preferred monovalent groups Q are those of formula II as defined above. Further preferred monovalent groups Q are those of formula V:

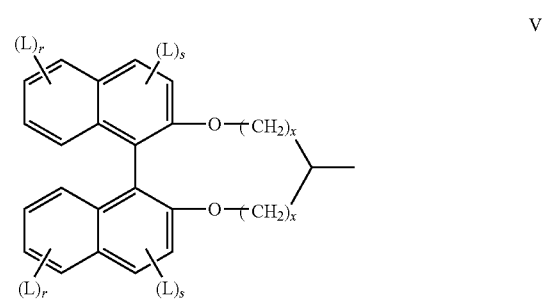

wherein L has in each occurrence independently of one another one of the meanings given above, r is in each occurrence independently of one another 0, 1, 2, 3 or 4, s is in each occurrence independently of one another 0, 1 or 2,
x is in each occurrence independently of one another 0, 1 or 2
Especially preferred are compounds wherein x is 1 or 2.

Preferred divalent groups Q are those of formula III as defined above. Further preferred divalent groups Q are for example those selected of the following formulae

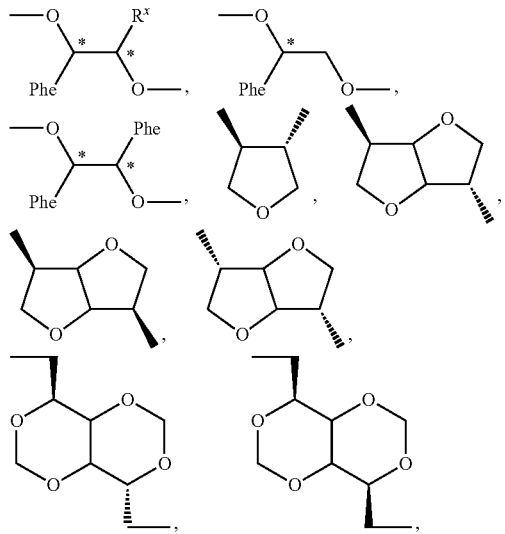

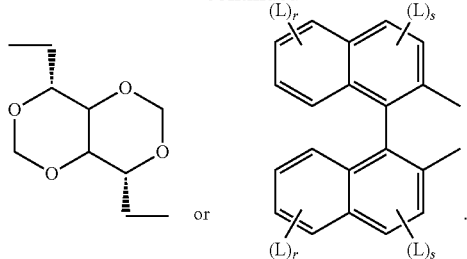

wherein Phe is phenyl, which is optionally mono- or polysubstituted with L as defined above, Rx is F or optionally fluorinated alkyl with 1 to 4 C atoms.

The RM material preferably comprises one or more RM's, preferably selected of formula I and IV, very preferably selected from mono- and direactive RM's.

The RM's as described above and below can be synthesized according to or in analogy to methods which are known per se and which are described in the literature and in standard works of organic chemistry such as, for example, Houben-Weyl, Methoden der organischen Chemie, Thieme-Verlag, Stuttgart.

Suitable RM's are disclosed for example in WO 93/22397, EP 0 261 712, DE 195 04 224, WO 95/22586, WO 97/00600, U.S. Pat. Nos. 5,518,652, 5,750,05, 5,770,107 and 6,514,578. Examples of particularly suitable and preferred RM's are shown in the following list.

(R1)
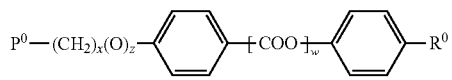

(R2)
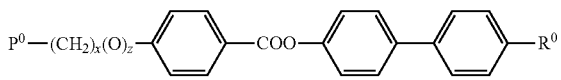

(R3)
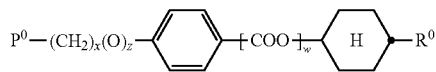

(R4)
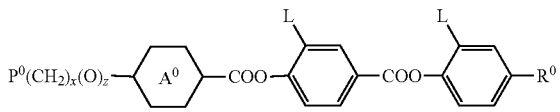

(R5)
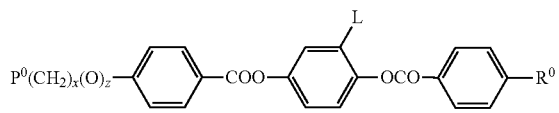

(R6)
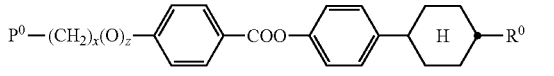

(R7)
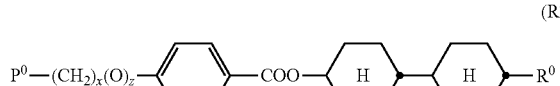

(R8)
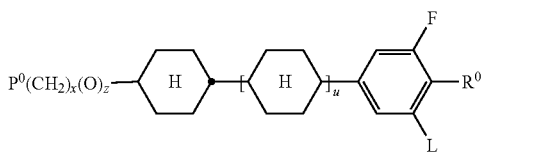

(R9)
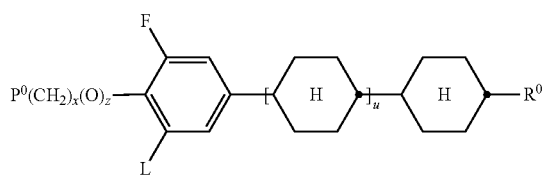

(R10)
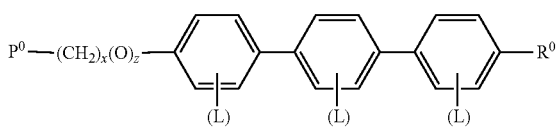

(R11)
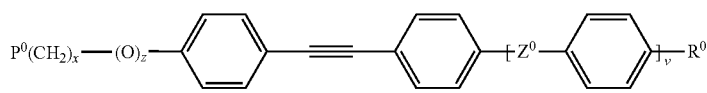

-continued
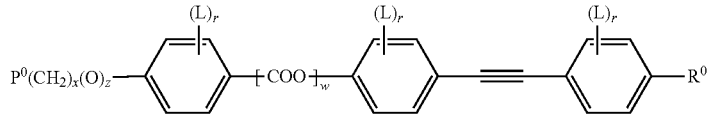
(R12)
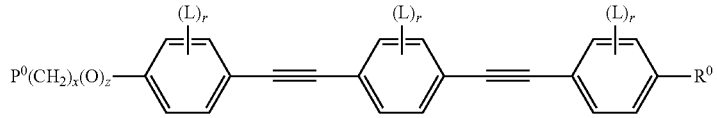
(R13)
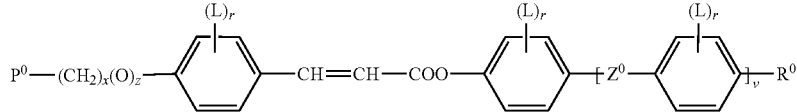
(R14)
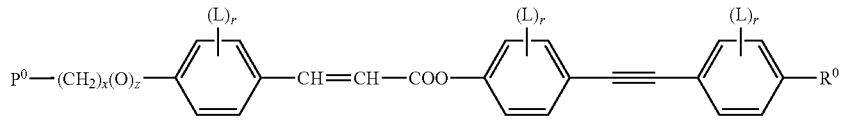
(R15)
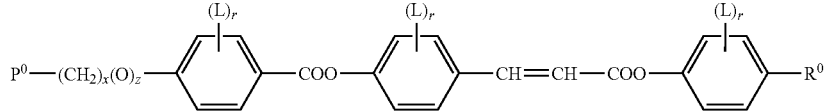
(R16)
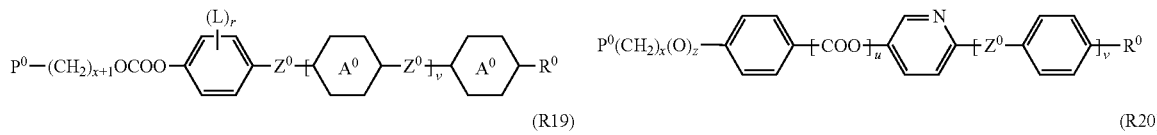
(R17) (R18)
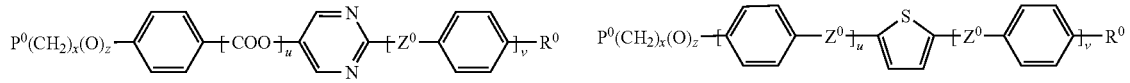
(R19) (R20)
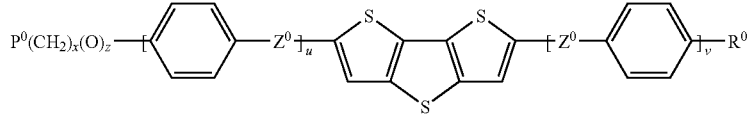
(R21)
(R22)
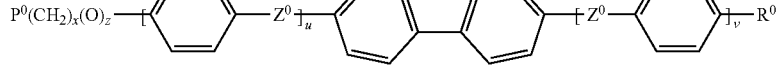
(R23)
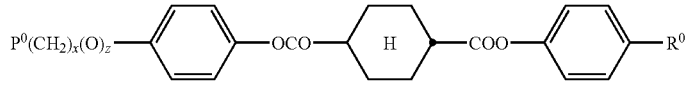
(R24)
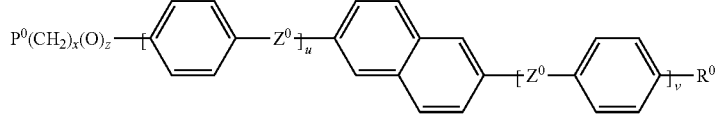
(R25)
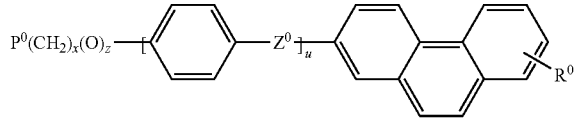

-continued
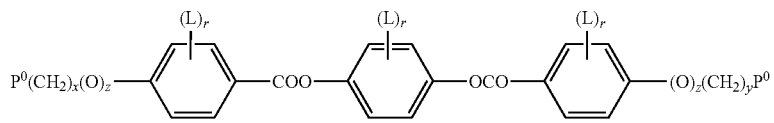 (R26)
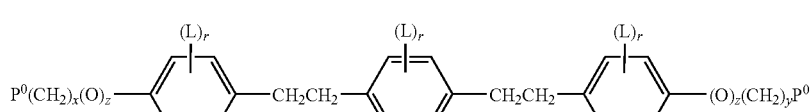 (R27)
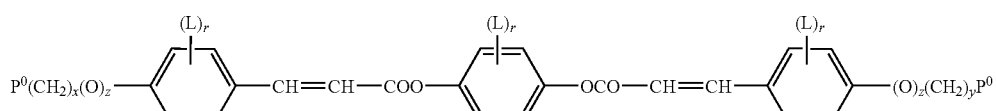 (R28)
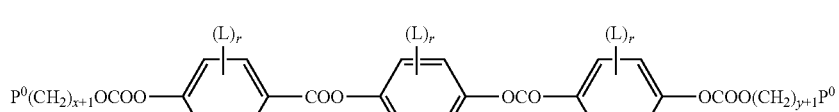 (R29)
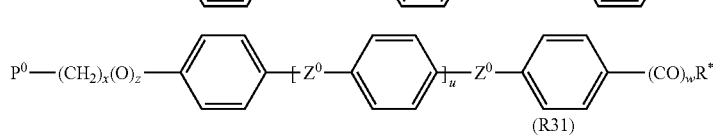 (R30)
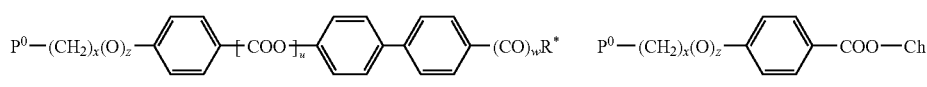 (R31) (R32)
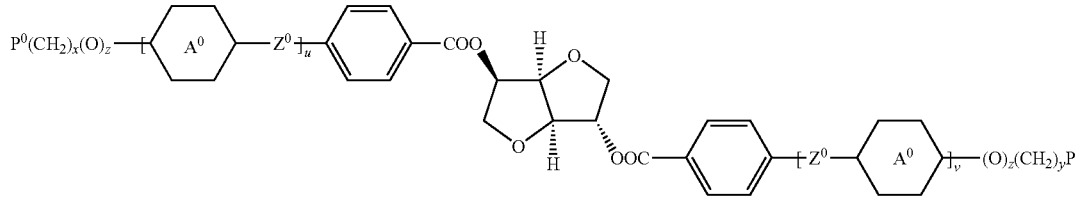 (R33)
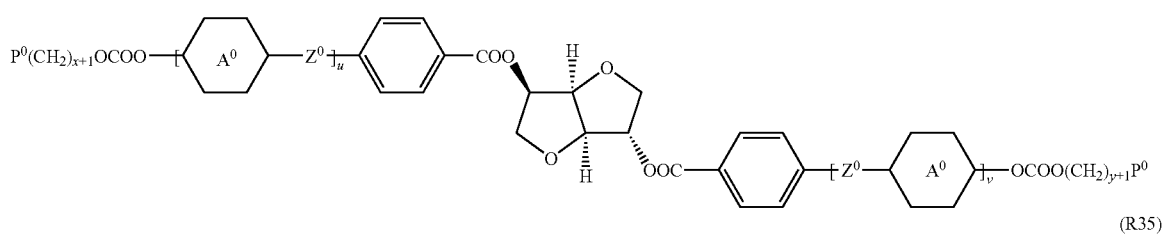 (R34)
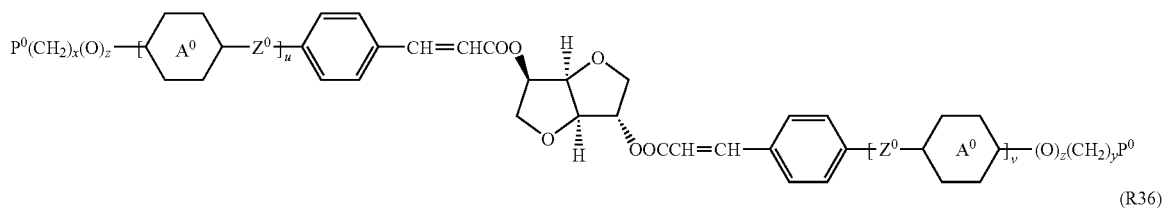 (R35)
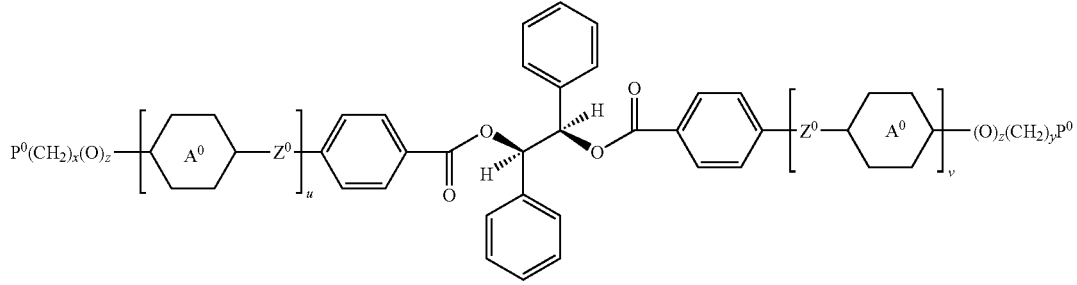 (R36)

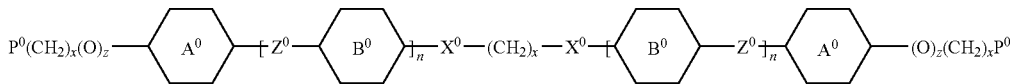

(R37)

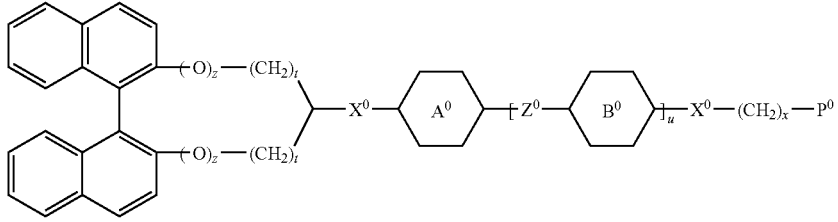

(R38)

wherein $P^0$ is, in case of multiple occurrence independently of one another, a polymerisable group, preferably an acryl, methacryl, oxetane, epoxy, vinyl, vinyloxy, propenyl ether or styrene group, $A^0$ and $B^0$ are, in case of multiple occurrence independently of one another, 1,4-phenylene that is optionally substituted with 1, 2, 3 or 4 groups L, or trans-1,4-cyclohexylene, $Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—, $Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, $R^{01,02}$ are independently of each other H, $R^0$ or $Y^0$, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, t is, in case of multiple occurrence independently of one another, 0, 1, 2 or 3, u and v are independently of each other 0, 1 or 2, w is 0 or 1, x and y are independently of each other 0 or identical or different integers from 1 to 12, z is 0 or 1, with z being 0 if the adjacent x or y is 0, and wherein the benzene and napthalene rings can additionally be substituted with one or more identical or different groups L.

In addition to the compounds of formula I and II, the polymerisable material may comprise one or more polymerisable or unpolymerisable chiral compounds. Suitable unpolymerisable chiral compounds are for example standard chiral dopants like R- or S-811, R- or S-1011, R- or S-2011, R- or S-3011, R- or S-4011, R- or S-5011, or CB 15 (all available from Merck KGaA, Darmstadt, Germany), sorbitols as described in WO 98/00428, hydrobenzoins as described in GB 2,328,207, chiral binaphthols as described in WO 02/94805, chiral binaphthol acetals as described in WO 02/34739, chiral TADDOLs as described in WO 02/06265, or chiral compounds having fluorinated linkage groups as described in WO 02/06196 or WO 02/06195. Suitable polymerisable chiral compounds are for example those listed above, or the polymerisable chiral material Paliocolor® LC756 (from BASF AG, Ludwigshafen, Germany).

The RM material may also comprise one or more surfactants that enhance the alignment of the RM's. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2 383 040 or polymerisable surfactants as described in EP 1 256 617.

It is also possible to further improve alignment by annealing the RM material at elevated temperature, preferably at its polymerisation temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

Polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure®) (Ciba Geigy AG, Basel, Switzerland). A typical cationic photoinitiator is for example UVI 6974 (Union Carbide).

The polymerisable material may also comprise one or more stabilizers or inhibitors to prevent undesired spontaneous polymerisation, like for example the commercially available Irganox® (Ciba Geigy AG, Basel, Switzerland).

The curing time depends, inter alia, on the reactivity of the polymerisable material, the thickness of the coated layer, the type of polymerisation initiator and the power of the UV lamp. The curing time is preferably ≦5 minutes, very preferably ≦3 minutes, most preferably ≦1 minute. For mass production short curing times of <30 seconds are preferred.

Preferably polymerisation is carried out in an inert gas atmosphere like nitrogen or argon.

The polymerisable material may also comprise one or more dyes having an absorption maximum adjusted to the wavelength of the radiation used for polymerisation, in particular UV dyes like e.g. 4,4"-azoxy anisole or Tinuvin® dyes (from Ciba AG, Basel, Switzerland).

In another preferred embodiment the polymerisable material comprises one or more monoreactive polymerisable non-mesogenic compounds, preferably in an amount of 0 to 50%, very preferably 0 to 20%. Typical examples are alkylacrylates or alkylmethacrylates.

In another preferred embodiment the polymerisable material comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerisable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

The polymerisable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a polymer film according to the present invention is preferably from 0.3 to 5 microns, very preferably from 0.5 to 3 microns, most preferably from 0.7 to 1.5 microns. For use as alignment layer, thin films with a thickness of 0.05 to 1, preferably 0.1 to 0.4 microns are preferred.

The polymer films of the present invention can be used as retardation or compensation film for example in LCDs to improve the contrast and brightness at large viewing angles and reduce the chromaticity. They can be used outside the switchable LC cell of the LCD or between the substrates, usually glass substrates, forming the switchable LC cell and containing the switchable LC medium (incell application).

The polymer films of the present invention can also be used themselves as alignment layer for a further LC material coated on top of them. For example, they can be used in an LCD to induce or improve alignment of the switchable LC medium, or to align a subsequent layer of polymerisable LC material coated thereon. In this way, stacks of polymerised LC films can be prepared.

In particular, the layers and polymer films according to the present invention can be used in reflective polarisers as disclosed in GB 2 315 072 or WO 97/35219, negative C plate retarders as disclosed in WO 01/20394 or WO 2004/013666, biaxial negative C plate retarders as disclosed in WO 2003/054111, alignment layers as disclosed in EP 1 376 163, birefringent markings or images for decorative or security use as disclosed in GB 2 315 760, WO 02/85642, EP 1 295 929 or EP 1 381 022.

The polymer films of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned) or PVA (patterned vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The following examples are intended to explain the invention without restricting it. The methods, structures and properties described hereinafter can also be applied or transferred to materials that are claimed in this invention but not explicitly described in the foregoing specification or in the examples.

Above and below, percentages are percent by weight. All temperatures are given in degrees Celsius. The optical and electrooptical data are measured at 20° C., unless expressly stated otherwise. Unless stated otherwise, the precentages of components of a polymerisable mixture as given above and below refer to the total amount of solids in the mixture polymerisable mixture, i.e. not including solvents.

EXAMPLE 1

Figure 3:
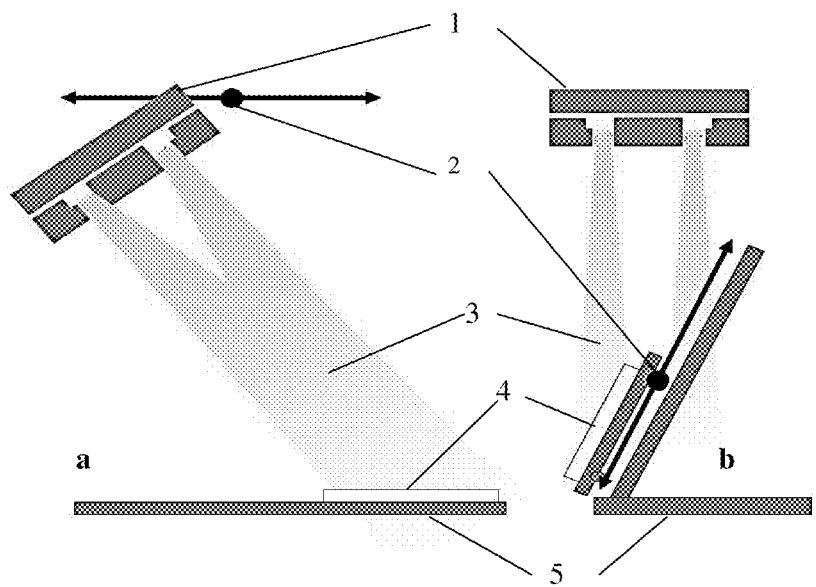
FIG. 3 depicts plasma beam irradiation schemes applied in a process according to the present invention. The (a) and (b) schemes correspond to source and sample moving arrangements, respectively.
Figure 4:
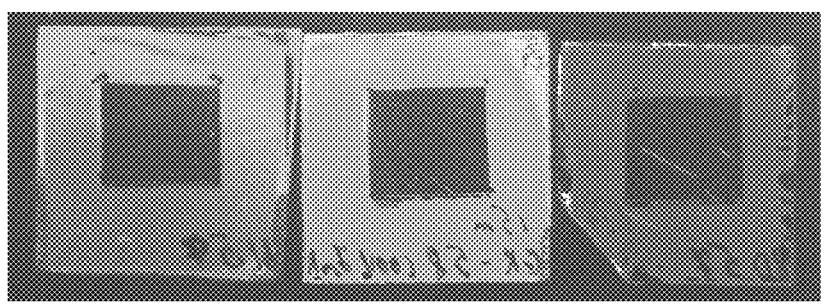
FIG. 4 shows the photo of the film samples according to example 1 of the present invention viewed between a pare of crossed polarizers. The black area correspond to plasma treated area of color filter film.
Figure 5:
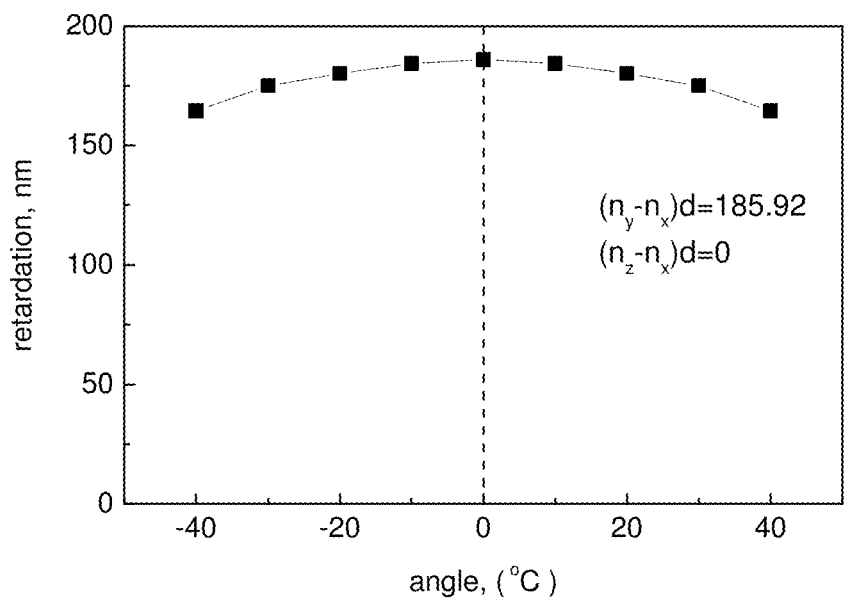
FIG. 5 shows the retardation profile of a film according to example 1 of the present invention.

Three individual films of colour filter layers (R, G, B) coated on separate glass slides are irradiated with plasma beam in geometry 2 (FIG. 3). The irradiation parameters are as follows: plasma incidence angle α=70°, ion current density j=6 μA/cm², ion energy E=600 eV, irradiation time $\tau_{exp}$=5 min. The sample is cyclically moved during irradiation with the translation speed of 2 mm/s. The average distance between the source and processed area of the sample is 8 cm. Onto this substrate is spin-coated the planar nematic RM mixture RMM141 (commercially available from Merck KGaA, Darmstadt, Germany) dissolved in toluene (30 wt. %). The spin-coating conditions are 3000 rpm, 30 s. The solvent is evaporated and the resultant film heated to anneal for 1 minute at 60° C. Then part of the film is irradiated by broad spectrum UV light from high-pressure mercury lamp with the irradiation intensity of 80 mW/cm² during 1 min. The irradiated area shows highly uniform alignment (FIG. 4) and the optic properties of a positive A plate (FIG. 5).

EXAMPLE 2

The samples are prepared as in example 1 except that the colour filter layers are processed in geometry 1 (FIG. 3). The processing parameters are the same as in Example 1. The samples demonstrate alignment quality comparable with that for the samples exposed in geometry 1.

EXAMPLE 3

A colour filter array (RGB+black matrix) is used as substrate for the RM layer. The plasma processing and RM film coating conditions are the same as in Example 1. The sample shows uniform planar alignment in the plasma-processed area, which is comparable with the alignment in the samples of Example 1.

EXAMPLE 4

The samples are prepared as in example 1 except that the colour filter layers are coated by the planar nematic RM mixture RMS04-073 (commercially available from Merck KGaA, Darmstadt, Germany). The sample shows uniform planar alignment in the plasma-processed area comparable with that for the samples of Example 1. The films have the optical properties of a positive A film.

EXAMPLE 5

The samples are prepared as in example 1 except that the colour filter layers are coated by the planar cholesteric RM mixture RMM123 (commercially available from Merck KGaA). The RM layer aligns into a uniform planar cholesteric structure. The plasma processed area is compared to the non-processed area and shown to have much more uniform alignment.

Figure 6A:
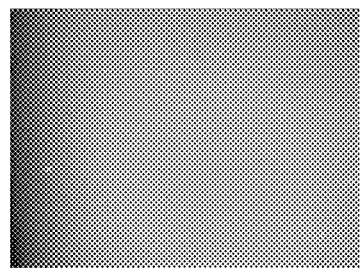
FIG. 6 shows the photo of a film sample according to example 5 of the present invention sample (6a), and of a comparison film sample (6b), taken through a polarised microscope.
Figure 6B:
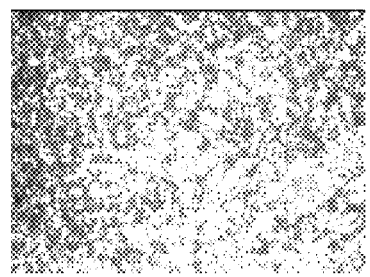

A 38% w/w solution of a cholesteric RM mixture that has its reflection band in the UV is prepared by dissolving RMM123 in 7:3 toluene cyclohexanone. This solution is spin coated at 300 rpm for 30 seconds onto plasma treated blue colour filter film. The sample is annealed at 60° C. which is just below the clearing point of the mixture. The film is polymerised by exposing the film to UV irradiation from a medium pressure Hg lamp. The film is examined by polarised microscopy and found to have good alignment. A photo of the sample taken through a polarised microscope (magnification 50×) is depicted in FIG. 6*a*, and shows that the typical defect line associated with poorly aligned cholesteric mixtures cannot be observed. A photo of a reference sample of a poorly aligned cholesteric film is shown in comparison in FIG. 6*b*. In this comparison sample the light blue areas are indicative of areas of poor alignment, therefore the light is scattered and depolarised.

EXAMPLE 6

A colour filter array (R,G,B+black matrix) is used as substrate for the RM layer. The plasma processing conditions are the same as in Example 1. The colour filter array is coated with the cholesteric mixture RMM123. A uniform planar cholesteric structure is observed in the RM layer.

EXAMPLE 7

An isotropic TAC film is irradiated with plasma beam in geometry 2 (FIG. 3). The irradiation parameters are as follows: plasma incidence angle $\alpha=75°$, ion current density $j=8$-$10\,\mu A/cm^2$, ion energy $E=800$ eV, irradiation time $\tau_{exp}=5$ min. The sample is moved in one direction during irradiation with a speed of 1 mm/s to model roll-to-roll translation. The average distance between the source and processed area of the sample is 10 cm. Onto this substrate is spin-coated the planar nematic RM mixture RMM141 (commercially available from Merck KGaA, Darmstadt, Germany) dissolved in hexane. In 1 min this film is irradiated by a broad spectrum UV light from a high-pressure mercury lamp with the irradiation intensity of 60 mW/cm² during 30 s. The RM layer shows highly uniform alignment and the optical properties of a positive A plate.

EXAMPLE 8

An isotropic TAC film is processed as in Example 7 and coated by the planar nematic RM mixture RMS04-073 (commercially available from Merck KGaA, Darmstadt, Germany). The photopolymerization conditions are as in Example 7 too. The alignment uniformity is as in Example 7. The compensation characteristics of a positive A plate are obtained.

EXAMPLE 9

An isotropic COP (cycloolefin polymer) film is irradiated with plasma beam in geometry 2 (FIG. 3) and coated by RMM141. The plasma processing and film coating conditions are as in Example 7. The alignment quality and film properties are similar to that in Example 7.

EXAMPLE 10

An isotropic COP film is irradiated with plasma beam in geometry 2 (FIG. 3) and coated by RMS04-073 as in Example 7. The plasma processing and film coating conditions are as in Example 7. The alignment quality and film properties are similar to that in Example 7.

EXAMPLE 11

An anisotropic (stretched) COP film is used as the substrate for the RM layer. The in-plane retardation of this film is measured to be 120 nm. The film is irradiated with plasma beam in geometry 2 (FIG. 3) and coated by RMM141 as in Example 7. The alignment direction of the RM's induced by plasma process is perpendicular to the optic axis of the stretched COP film. Uniform alignment of the RM layer towards plasma processing direction is observed. The integral in-plane birefringence of COP/RM film is 4 nm, i.e. close to zero.

EXAMPLE 12

Figure 7:
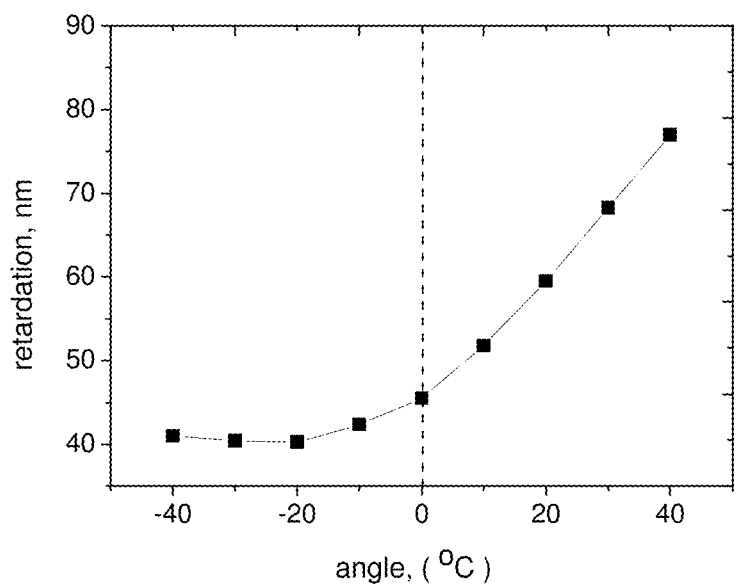
FIG. 7 shows the retardation profile of a film according to example 12 of the present invention.

An isotropic TAC film is irradiated with plasma beam in geometry 2 (FIG. 3). The irradiation parameters are as follows: plasma incidence angle $\alpha=70°$, ion current density $j=7$-$8\,\mu A/cm^2$, ion energy $E=700$ eV, irradiation time $\tau_{exp}=10$ min. The sample is moved in one direction during irradiation with a speed of 1 mm/s to model roll-to-roll translation. The average distance between the source and processed area of sample is 10 cm. Onto this substrate is spin-coated the nematic RM mixture RMS04-007 (commercially available from Merck KGaA, Darmstadt, Germany). The film is irradiated by a broad spectrum UV light from high-pressure mercury lamp with the irradiation intensity of 100 mW/cm² during 30 s. The RM film shows uniform alignment with the optical properties of the splayed O plate. The retardation profile is shown in FIG. 7 (optic axis lies in the incidence plane of testing light beam).

EXAMPLE 13

A bare glass slide is irradiated with plasma beam in geometry 2 (FIG. 3). The irradiation parameters are as follows: plasma incidence angle $\alpha=70°$, ion current density $j=4$-$5$ $\mu A/cm^2$, ion energy $E=500$ eV, irradiation time $\tau_{exp}=5$ min. The sample is cyclically moved during irradiation with the translation speed of 2 mm/s. The average distance between the source and processed area of sample is 8 cm. Onto this substrate is coated the planar nematic RM mixture RMM141 as in Example 1. The irradiated area shows highly uniform alignment and the optic properties of a positive A plate. This retardation profile is typical of a homeotropic film coated on a substrate which has the optics of an A plate.

EXAMPLE 14

Figure 8:
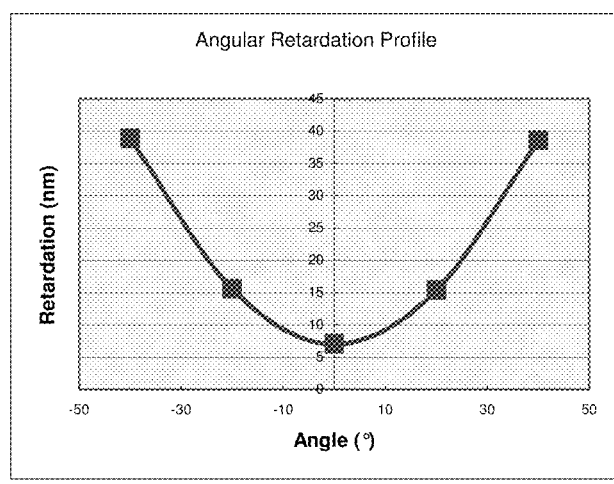
FIG. 8 shows the retardation profile of a film according to example 14 of the present invention.

A part of COP film is exposed to plasma treatment under the following conditions: cycling scanning irradiation regime (650V, 15 $\mu A/cm^2$, 5 min, v=4.5 mm/s). The RM mixture RMS04-007 (as in example 12) is coated on the plasma treated COP film by spin-coating method (3000 rpm, t=30 sec). The coated film is polymerised by being exposed to UV irradiation (100 mW/cm$^2$) for 1 min. The RM's film on the plasma processed part of COP film has homeotropic alignment. The retardation profile is shown in FIG. 8. The retardation profile shows that the film has the optical properties of a positive C plate. No uniform alignment of RM's film is observed on the unprocessed part of the COP film.

EXAMPLE 15

Figure 9:
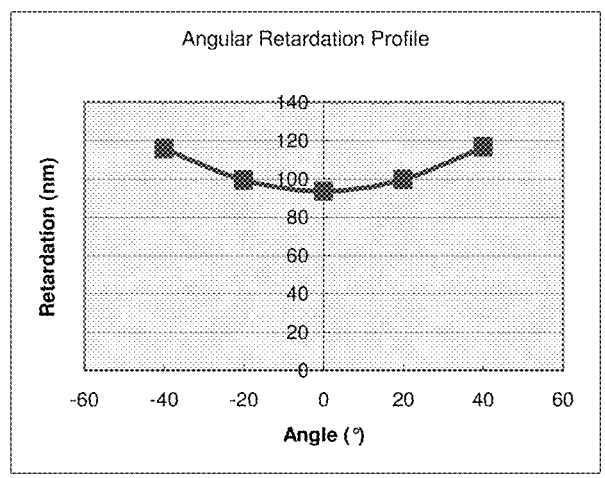
FIG. 9 shows the retardation profile of a film according to example 15 of the present invention.

A stretched COP film (which had A-plate type properties) is exposed to plasma treatment under the following conditions: Cycling scanning irradiation regime (650V, 15 $\mu A/cm^2$, 5 min, v=4.5 mm/s). The RM mixture RMS04-007 (as in example 12) is coated on the plasma treated COP film by spin-coating method (3000 rpm, t=30 sec). The aligned coated film polymerised by being exposed to UV irradiation (100 mW/cm$^2$) for 1 min. The film has homeotropic alignment. The retardation profile is shown in FIG. 9.

EXAMPLE 16

An isotropic TAC film is coated with $SiO_2$ via a sputtering deposition process. Subsequently, the $SiO_2$ coating is treated with a plasma beam and coated with a layer of the RM mixture RMM141 which is then cured. Plasma treatment and coating and curing of the RM layer are carried out as described in example 7. The solidified RM layer shows uniform alignment and the optical properties of a positive A plate. This also proves that a gas barrier layer (like $SiO_2$) can be placed between the plastic substrate and the RM film.

Further modifications, changes, and improvements will occur to those skilled in the art without departing from the spirit and scope of the invention. For example, uniform alignment of reactive mesogens on plasma beam processed substrates demonstrated by Examples 1 to 12 implies uniform alignment induced by the ion beam processing method. Different kinds of ion beam and plasma beam sources can be used for the alignment treatment purpose. The choice of ALS is exclusively caused by the desire to obtain reliable and simply controlled process, well adapted for the alignment treatment of large area substrates, also roll-to-roll treatment of rollable plastic films. The proposed alignment process can be used in combination with other processes, e.g. rubbing, especially to produce alignment patterns: the plasma beam processing overrides alignment induced by rubbing. The plasma beam action may give other advantages not considered in the Examples, e.g. improved wetting of alignment substrates with RM solutions and improved adhesion of RM films.

The invention claimed is:

1. A process for aligning reactive mesogens (RM's), comprising:
   exposing at least a portion of a substrate to a particle beam that produces an aligning direction on said substrate, and
   applying a layer comprising one or more RM's onto said substrate.

2. A process according to claim 1, wherein the particle beam is a beam of accelerated plasma.

3. A process according to claim 1, wherein the substrate does not comprise an alignment layer.

4. A process according to claim 1, wherein the substrate is not rubbed.

5. A process according to claim 1, wherein the substrate comprises an organic or inorganic material.

6. A process according to claim 1, wherein the substrate is selected from glass, quartz, plastic or silicon, or comprises one or more layers of these materials.

7. A process according to claim 1, wherein the substrate is a color filter.

8. A process according to claim 1, wherein at least a portion of the substrate is bombarded with a plasma beam from a plasma beam source at an incident angle of from >0° to 85° relative to the substrate normal.

9. A process according to claim 8, wherein the incident angle is from 45° to 85°.

10. A process according to claim 1, wherein the substrate is positioned at a distance of 5 to 50 cm from the plasma beam source.

11. A process according to claim 1, wherein the current density of the plasma beam is from 0.1 to 1000 $\mu A/cm^2$, and the ion energy is from 100 to 5000 eV.

12. A process according to claim 1, wherein the plasma beam source is an anode layer source.

13. A process according to claim 1, wherein the plasma beam is in the form of a sheet.

14. A process according to claim 1, wherein the alignment induced in the RM layer by said process is homeotropic, planar or tilted alignment.

15. A process according to claim 1, further comprising utilizing a mask to prevent the plasma beam from reaching a predetermined portion of the substrate.

16. A process according to claim 1, wherein the alignment induced in the RM layer by said process comprises a pattern of at least two regions having different alignment direction.

17. A process according to claim 1, further comprising moving the aligning substrate through a path of the plasma beam.

18. A process according to claim 1, wherein said process is carried out as roll-to-roll alignment treatment of rollable plastic substrates.

19. A process according to claim 1, wherein the RM's are selected from the following formulae P-Sp-MG-R     I $(R\text{-}(A^1\text{-}Z^1)_m)_k\text{-}Q$     IV wherein
P is a polymerizable group,
Sp is a spacer group or a single bond,
R is selected from H, F, Cl, Br, I, CN, NCS, $SF_5$, or straight-chain or branched alkyl having 1 to 30 C-atoms that is optionally mono- or polysubstituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1$=$CY^2$— or —C≡C— in such a manner that O and/or S atoms are not linked directly to one another, or denotes P-Sp-, wherein in formula IV at least one R is P-Sp-,
$R^0$ and $R^{00}$ independently of each other denote H or alkyl with 1 to 12 C-atoms,
Q is a k-valent chiral group,
k is 1, 2, 3, 4, 5 or 6, and
MG is a mesogenic group of formula II

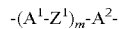     II $A^1$ and $A^2$ are, in case of multiple occurrence independently of one another, an aromatic or alicyclic group, which optionally contains one or more heteroatoms selected from N, O and S, and is optionally mono- or polysubstituted by R as defined in formula I,
$Z^1$ in case of multiple occurrence independently of one another denotes —O—, —S—, —CO—, —COO—, —OCO—, —S—CO—, —CO—S—, —O—COO—, —CO—$NR^0$—, —$NR^0$—CO—, —$NR^0$—CO—$NR^{00}$, —$NR^0$—CO—O—, —O—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_4$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C—, —CH=CH—COO—, —OCO—CH=CH— or a single bond,
$R^0$ and $R^{00}$ are as defined in formula I,
$Y^1$ and $Y^2$ independently of each other denote H, F, Cl or CN, and
m is 0, 1, 2, 3 or 4.

20. A process according to claim 1, wherein the RM's are selected of the following formulae (R1)
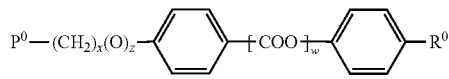

(R2)
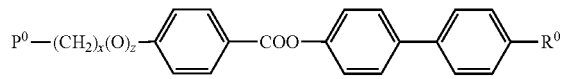

(R3)
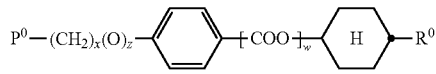

(R4)
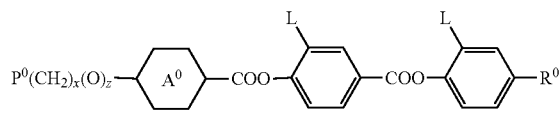

(R5)
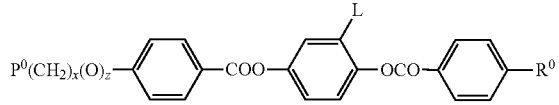

(R6)
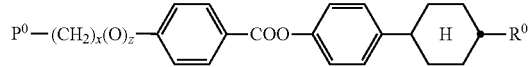

(R7)
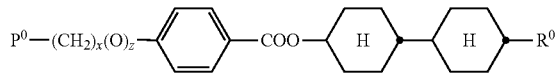

(R8)
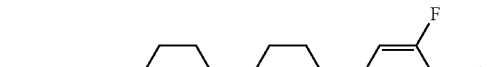

(R9)
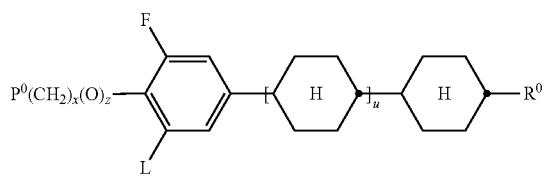

(R10)
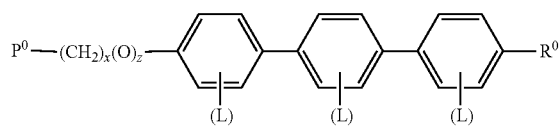

(R11)
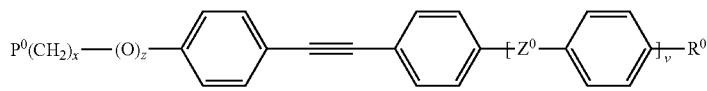

(R12)
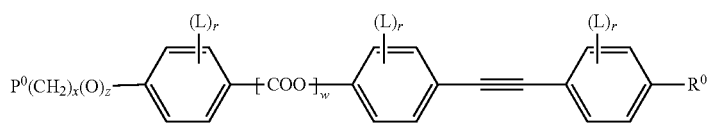

-continued
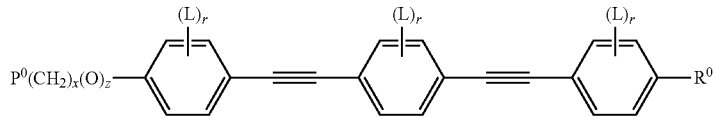 (R13)
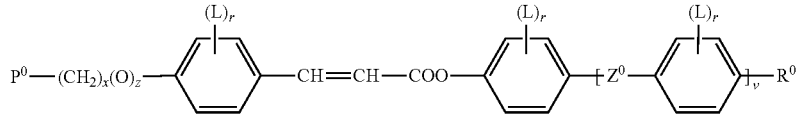 (R14)
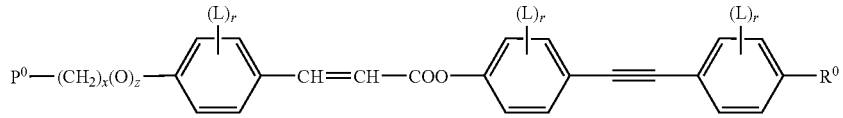 (R15)
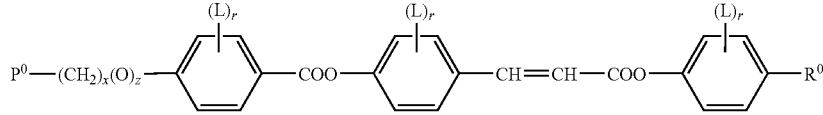 (R16)
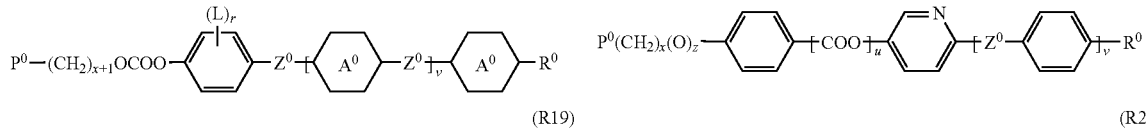 (R17)
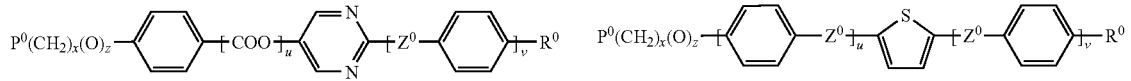 (R18)
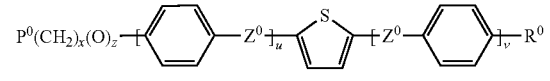
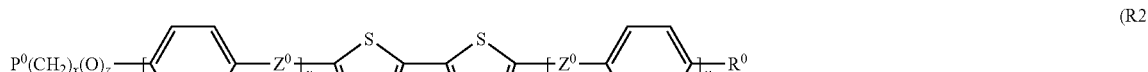 (R19)
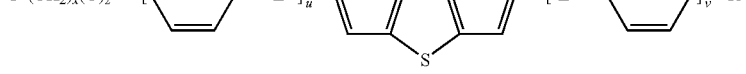 (R20)
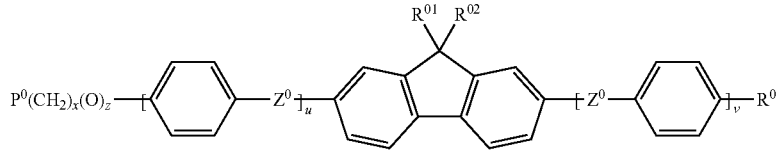 (R21)
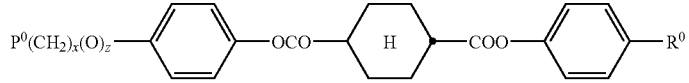 (R22)
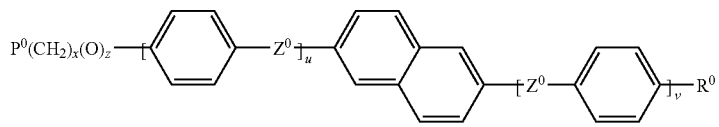 (R23)
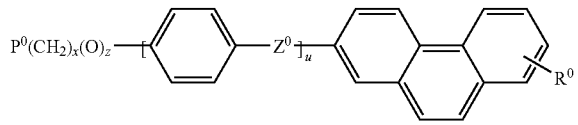 (R24)
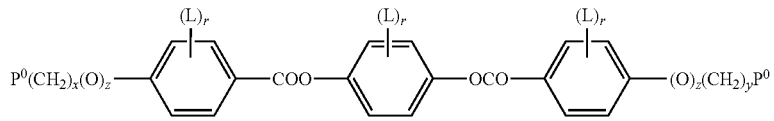 (R25)
(R26)

-continued
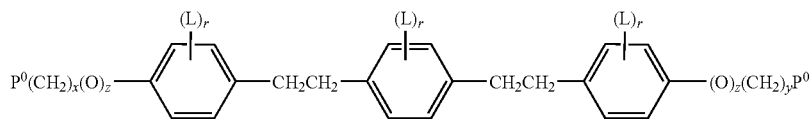
(R27)
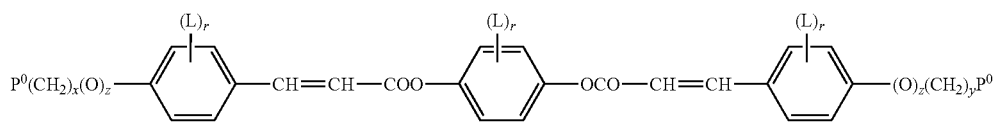
(R28)
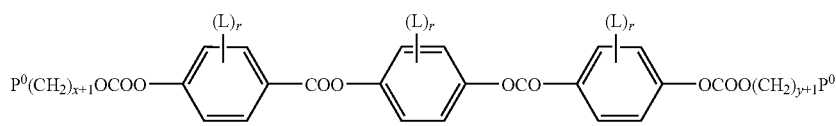
(R29)
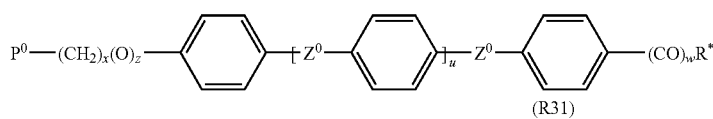
(R30)
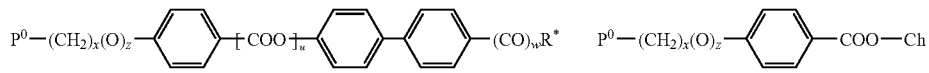
(R31) (R32)
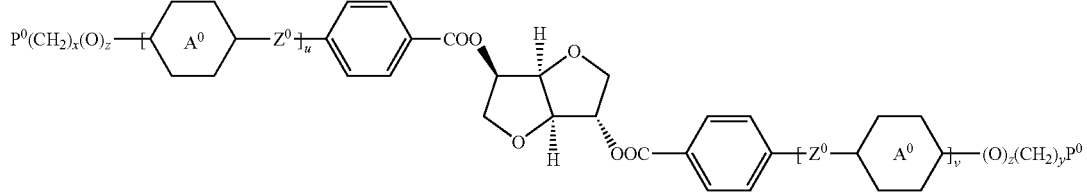
(R33)
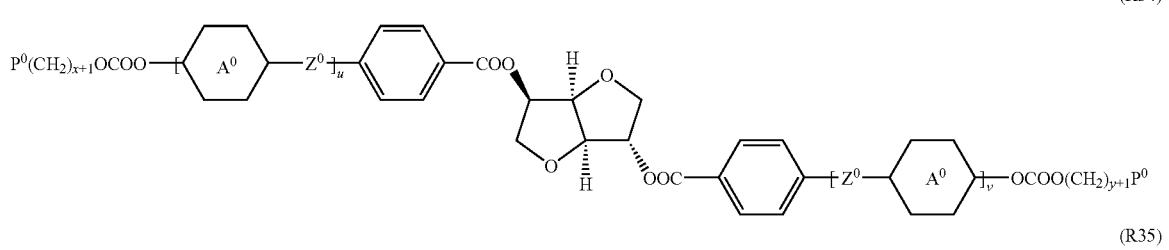
(R34)
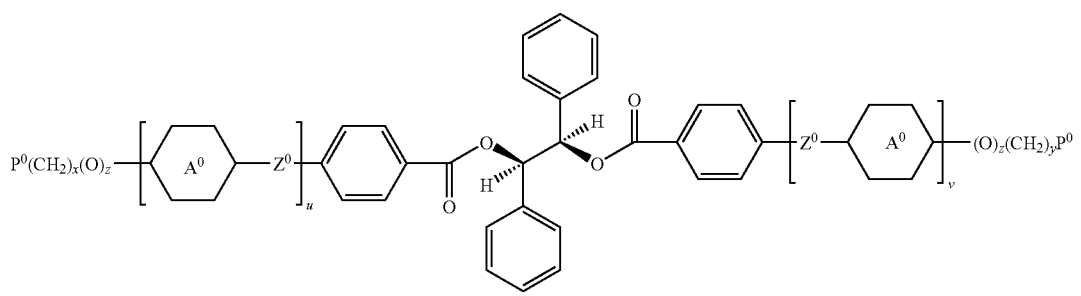
(R35) (R36)
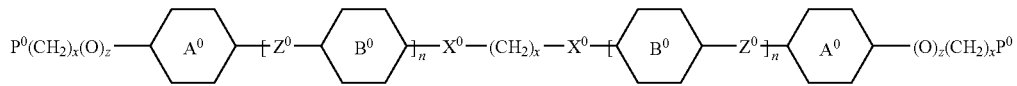
(R37)

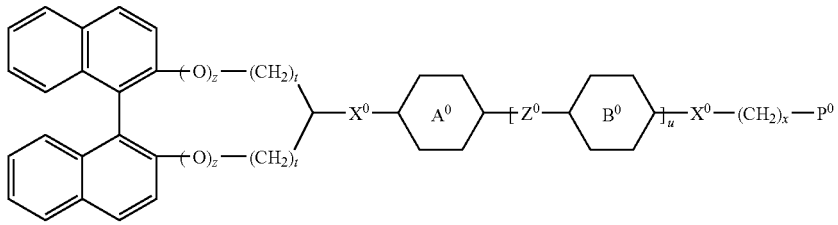
(R38)

wherein
$P^0$ is, in case of multiple occurrence independently of one another, a polymerizable group,
$A^0$ and $B^0$ are, in case of multiple occurrence independently of one another, 1,4-phenylene that is optionally substituted with 1, 2, 3 or 4 groups L, or trans-1,4-cyclohexylene,
$Z^0$ is, in case of multiple occurrence independently of one another, —COO—, —OCO—, —CH$_2$CH$_2$—, —C≡C—, —CH═CH—, —CH═CH—COO—, —OCO—CH═CH— or a single bond,
$R^0$ is alkyl, alkoxy, thioalkyl, alkylcarbonyl, alkoxycarbonyl, alkylcarbonyloxy or alkoxycarbonyloxy which is optionally fluorinated, or is $Y^0$ or P—(CH$_2$)$_y$—(O)$_z$—,
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$R^{01,02}$ are independently of each other H, $R^0$ or $Y^0$,
R* is a chiral alkyl or alkoxy group with 4 or more C atoms,
Ch is a chiral group selected from cholesteryl, estradiol, or terpenoid radicals like menthyl or citronellyl,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0,
and wherein the benzene and napthalene rings can additionally be substituted with one or more identical or different groups L.

21. A process according to claim 1, further comprising polymerizing or crosslinking the oriented RM layer, and optionally removing the polymerized or crosslinked RM layer from the substrate.

22. A process according to claim 21, wherein the RM layer is polymerized or crosslinked by exposure to heat or actinic radiation.

23. A process according to claim 20, wherein
$R^0$ is alkyl, alkoxy, thioalkyl, alkylcarbonyl, alkoxycarbonyl, alkylcarbonyloxy or alkoxycarbonyloxy having up to 15 C atoms, which is optionally fluorinated, or is $Y^0$ or P—(CH$_2$)$_y$—(O)$_z$—, and
R* is a chiral alkyl or alkoxy group with 4 to 12 C atoms.

24. A process according to claim 20, wherein R* is 2-methylbutyl, 2-methyloctyl, 2-methylbutoxy or 2-methyloctoxy.

25. A process according to claim 1, wherein only one substrate is present.

26. A process according to claim 1, wherein the substrate does not comprise an additional aligning film.

* * * * *

UNITED STATES PATENT AND TRADEMARK OFFICE
CERTIFICATE OF CORRECTION

PATENT NO.      : 8,414,983 B2                                                Page 1 of 1
APPLICATION NO. : 12/439403
DATED           : April 9, 2013
INVENTOR(S)     : Parri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

First Day of September, 2015

Michelle K. Lee
*Director of the United States Patent and Trademark Office*